Feb. 27, 1968 A. E. BROWN 3,370,786
MULTIFINGER DUAL VALVE
Filed April 19, 1966 2 Sheets-Sheet 1

INVENTOR.
ARTHUR E. BROWN

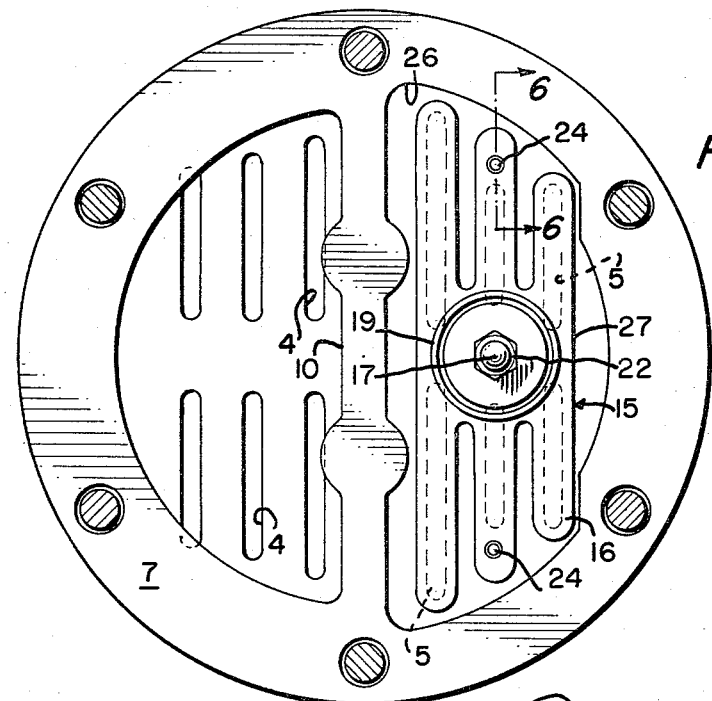
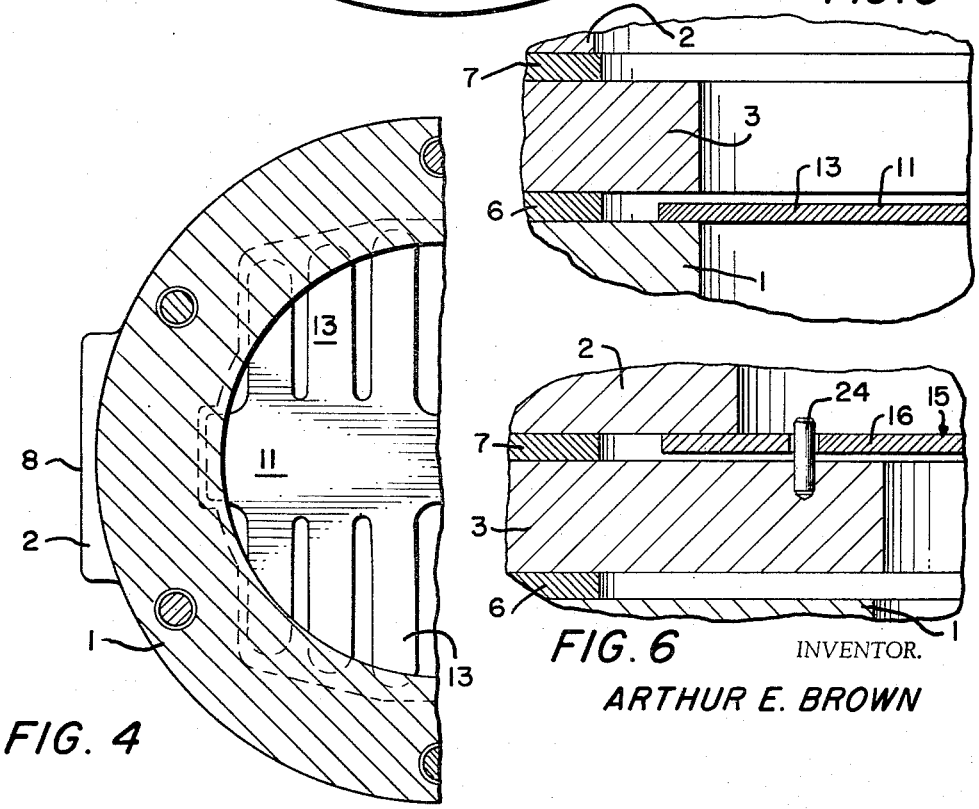

United States Patent Office 3,370,786
Patented Feb. 27, 1968

3,370,786
MULTIFINGER DUAL VALVE
Arthur E. Brown, Corning, N.Y., assignor to Ingersoll-Rand Company, New York, N.Y., a corporation of New Jersey
Filed Apr. 19, 1966, Ser. No. 543,597
9 Claims. (Cl. 230—231)

ABSTRACT OF THE DISCLOSURE

A valve for use with reciprocating piston compressors. It includes a valve plate having a plurality of holes and an inlet valve in the shape of a tree with a plurality of fingers extending laterally from the trunk. The trunk is secured to the valve plate at the end opposite from the fingers. The outlet valve has a central hub and a plurality of fingers extending outwardly from the central hub. The fingers of the inlet valve cover some holes in the valve plate and the fingers of the outlet valve cover the remainder of the holes in the valve plate. Each valve limits fluid flow to one direction.

---

This invention relates to what is commonly known as finger or reed valves. This type of valve includes an elongated finger or reed which cooperates with a hole, or elongated opening in a plate to limit the flow of fluid through the opening to one direction.

In prior valves of this type, only a portion of the reed or finger would lift. This is adequate when a circular port is used. However, when an elongated opening is employed, it is necessary that the reed lift completely off the opening in order to promote complete and even flow of fluid and reduce pressure drop across the valve.

It is the principal object of this invention to provide a finger valve which permits a substantial increase in flow area.

It is another object of this invention to provide a novel valve which has low clearance.

It is a further object of this invention to provide a valve assembly for a reciprocating compressor which has adequate flow area and low clearance.

Generally speaking, these objects are carried out by providing a plate or other valve element having a plurality of elongated openings. There is a first flexible member mounted on one side of the plate. This flexible member includes a trunk portion and a plurality of fingers adapted to cover some of the openings in the plate. These fingers are adapted to lift off the openings by fluid under pressure acting on these fingers. There is a second flexible member mounted on the opposite side of the plate. This flexible member includes a central portion and a plurality of fingers extending therefrom. These fingers cover the remainder of the openings in the plate. There is means for biasing the central portion towards the plate. Stop means overlies the ends of the fingers for limiting upward movement of the ends of the fingers. The fingers on the second flexible member are free to flex upwardly between the stop means and the biasing means without limitation.

The invention will be described in connection with a reciprocating compressor although it can be used in many applications and is not intended to be limited thereby.

These and other objects will become apparent from the following description and drawings in which:

FIG. 3 is a section taken on the line 3—3 of FIG. 1 in the direction of the arrows;

FIG. 4 is a section taken on the line 4—4 of FIG. 1 in the direction of the arrows;

FIG. 5 is a detail taken on line 5—5 of FIG. 2 in the direction of the arrows with the inlet valve in the open position; and FIG. 6 is a detail taken on line 6—6 of FIG. 3 in the direction of the arrows showing the discharge valve in the open position.

Figure 1:
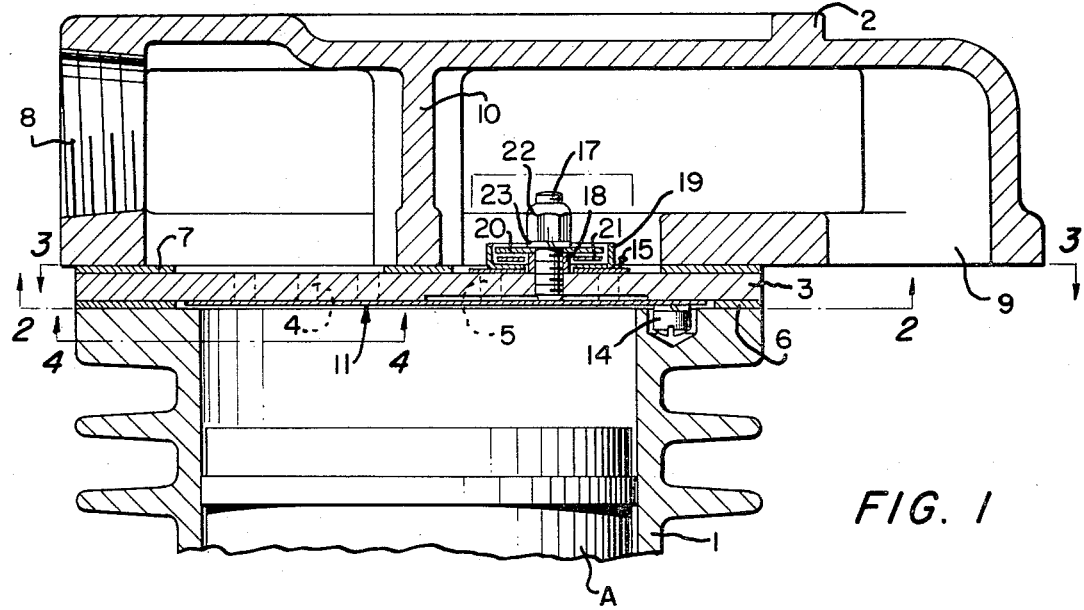
FIG. 1 is a vertical elevation of a cylinder head of a reciprocating compressor employing an embodiment of this invention.
Figure 2:
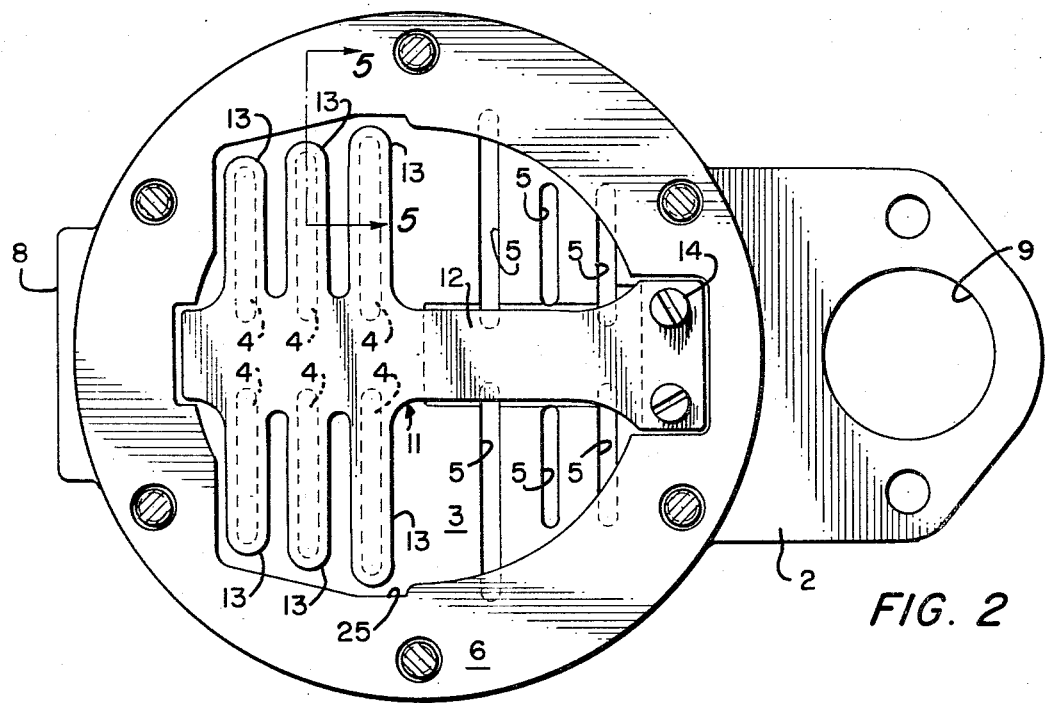
FIG. 2 is a section taken on the line 2—2 of FIG. 1 in the direction of the arrows.

Referring to the drawings, there is a cylinder 1 which houses a reciprocating piston A and a head 2. There is a valve plate or element 3 having a plurality of elongated openings 4 and 5. A gasket 6 is interposed between the cylinder 1 and the valve plate 3. A gasket 7 is placed between the valve plate 3 and the cylinder head 2.

The cylinder head has an inlet opening 8 and an outlet connection 9 with a wall 10 interposed therebetween to prevent flow between the inlet and the outlet.

The inlet valve, generally indicated at 11, is a resilient member preferably made of thin metal and includes a trunk portion 12 and six fingers 13 extending outwardly from one end. Although six fingers are used, there may be more or less depending on the use of the valve and the capacity required. The trunk portion 12 is secured at its opposite end to the member 3 by a pair of screws 14.

On the downward stroke of the piston A, the inlet valve is drawn away from the plate 3 and fluid is drawn through the inlet 8. Fluid will pass through the openings 4 and around the fingers 13 into the cylinder 1. The valve will open until the fingers 13 and the outer end of the trunk 12 contact the top of the cylinder 1. The gasket 6 is cut out at 25 so that the fingers 13 are free to flex between the plate and the cylinder. As is readily apparent from FIG. 5, the amount of travel of the valve 11 is limited by the thickness of the gasket 6 since this thickness controls the distance between the valve plate 3 and the cylinder 1. Therefore, if a larger opening is required, the gasket may be made thicker and greater fluid flow will result.

By this invention a valve is provided which allows flow of fluid under pressure through elongated openings. Such a valve is shown as the outlet or discharge valve generally indicated at 15. This valve includes a flexible member preferably made of thin metal. This valve is mounted on the valve plate 3 on the side opposite to the inlet valve 11. The valve 15 is a resilient member having six fingers 16 connected by a central hub 27. As in the case of the inlet valve, there may be any number of fingers depending on the application and fluid flow requirements. The discharge valve 15 is slidably mounted on a stud 17 which is secured to the valve plate 3. This stud holds a spacer 18, a cup 19 and a damper plate 20. Inside the cup member 19 there is a valve spring 21. This spring may be of any suitable type, but a washer type is preferred. To assemble the valve, the spacer 18 is placed over the stud, then the valve member 15 is placed over the spacer 18 to cover the openings 5. The cup member 19 is then placed over the spacer, and the spring washer 21 is inserted in the cup 19. The damper plate covers the spring, and a nut 22 secures the components together. There is a lock washer 23 interposed between the nut 22 and the damper plate 19.

On the upward stroke of the piston A, the fluid in the cylinder 1 is compressed and forces the fingers 16 off the valve plate 3, and the fluid will pass through the openings 5 into the head 2 and out the discharge 9. As the piston A moves upward, the fluid under pressure forces the inlet valve 11 against the plate 3 closing the openings 4 to prevent fluid from exiting through the inlet 8.

The entire flexible member 15 may lift off the valve plate 3 a distance limited by the thickness of the gasket 7, as is readily apparent from FIG. 6, and by the distance between the bottom of the cup member 19 and the damper plate 20. The gasket 7 is cut out, as at 26, so that the ends of the fingers 16 may lift upwardly between the plate 3 and the cylinder head.

The principal advantage of this design is that the entire valve member 15 lifts off the valve plate, and the entire opening 5 is uncovered. In prior designs only the outer portions of the fingers or reeds would lift off the valve plate. In this design, using a spring biased central hub connecting the fingers, the tips of the fingers 16 lift until they strike the bottom of the head 2. The cylinder head acts as a stop means to limit upward movement of the ends of the fingers 16. The central hub lifts and, in turn, lifts the cup 19 flattening spring 21 against the plate 20. The member 15 may flex upwardly between the ends of the fingers and the hub without limitation. By allowing the entire member 15 to lift off the valve plate, the fingers do not tend to flex at the ends and thus wear longer. There is enough area for fluid to flow with a minimum pressure drop through the openings 5 and into the cylinder head.

Another advantage of this design is that it has low clearance volume. This is essential since the piston A may closely approach the inlet valve element 11.

The amount of opening permitted can be varied by increasing the thickness of the gasket 7 and loosening or tightening the nut 22.

In order to prevent the valve member 15 from rotating on the stud 17, two dowel pins 24 are provided which are fixed in the valve plate 3 and extend through two of the reeds 16.

Although this invention has been described for use in connection with a reciprocating piston type compressor, it is equally well adapted for use in any application where a one way valve is required, and it is not intended that this invention be limited in any way except by the appended claims.

I claim:

1. A valve for limiting the flow of fluid through an opening in a valve plate comprising:
   a flexible member having a central portion mounted on said plate and a finger extending therefrom;
   said finger covering said opening and adapted to be lifted off said opening by fluid under pressure;
   a stud mounted on said plate;
   means mounted on said stud for biasing said central portion toward said plate;
   stop means overlying the end of said finger;
   said finger being free to flex between said stop means and said biasing means without limitation;
   said biasing means including a cup member mounted on said stud, a spring washer mounted on said stud inside said cup member; a damping plate over said spring washer and means for limiting the upward movement of said cup.

2. The valve of claim 1 further including means for preventing rotation of said flexible member.

3. A valve for controlling the flow of fluid through a valve element having a plurality of openings therethrough comprising:
   a first flexible member mounted on one side of said element having a trunk portion and a plurality of fingers extending therefrom adapted to cover some of said openings and limit flow through said openings to one direction;
   a second flexible member mounted on the opposite side of said element having a central portion and a plurality of fingers extending therefrom adapted to cover the remainder of said openings and limit flow through the remainder of said openings to the opposite direction.
   means for biasing said second flexible member toward said element;
   stop means overlying the ends of said second-mentioned fingers for limiting the upward movement of the ends of said fingers;
   said second-mentioned fingers being free to flex between said biasing means and stop means without limitation; and
   stop means overlying the ends of the fingers on said first flexible member for limiting the movement of said first flexible member.

4. The valve of claim 6 further including a stud mounted to said member, said second flexible member is slidably mounted on said stud and said biasing means includes a cup-shaped member mounted on said stud over said flexible member, a spring washer in said cup, a damping plate over said spring and a means for limiting upward movement of said cup.

5. In combination with a cylinder having a piston mounted for reciprocal movement therein and a cylinder head having an inlet and an outlet, a valve for controlling the flow of fluid into and out of said cylinder comprising:
   a plate mounted between said cylinder and cylinder head having a plurality of openings therethrough;
   a first flexible member mounted on one side of said plate having a trunk portion and a plurality of fingers extending therefrom adapted to cover some of said openings and limit flow through said openings to one direction;
   stop means overlying the ends of the fingers on the first flexible member for limiting movement of said first flexible member;
   a second flexible member mounted on the opposite side of said plate having a central portion and a plurality of fingers extending therefrom adapted to cover the remainder of said openings and limit the flow of fluid through the remainder of said openings to the opposite direction;
   means for biasing said second flexible member toward said plate;
   stop means overlying the ends of the fingers on said second member for limiting the upward movement of the ends of said fingers;
   said second flexible member being free to flex upwardly between said biasing means and said stop means without limitation.

6. The apparatus of claim 5 wherein said stop means is the cylinder head and further including a first gasket interposed between said cylinder and said plate; said first gasket being of such a thickness that said first flexible member is free to flex until the ends of said fingers contact the top of said cylinder; and a second gasket interposed between said plate and said cylinder head; said second gasket being of such a thickness that said second flexible member is free to flex until the ends of said fingers contact the cylinder head.

7. A valve comprising:
   a valve plate having a plurality of spaced apart holes therethrough;
   a flexible member having a central hub mounted on said valve plate between said holes and having a plurality of fingers extending outwardly therefrom, each covering one of said holes and adapted to be lifted off said holes;
   a stud mounted on said valve plate;
   biasing means mounted on said stud and positioned over said central hub for biasing said flexible member toward said plate; and
   stop means overlying the ends of said fingers to limit the distance said fingers lift off said valve plate;
   said fingers being free to flex between said biasing means and said stop means;
   said biasing means including cup means mounted on said stud, spring means mounted on said stud inside said cup means, damping plate means over said spring means and means for limiting the upward movement of said cup means.

8. The valve of claim 7 further including pin means for preventing said flexible member from rotating relative to said valve plate.

9. The valve of claim 8 wherein said pin means includes a dowel pin mounted on said valve plate and at least one of said fingers being provided with a hole for receiving said dowel pin.

References Cited

UNITED STATES PATENTS

| | | | | |
|---|---|---|---|---|
| 1,197,936 | 9/1916 | Ivens | | 137—512.15 |
| 1,614,124 | 1/1927 | Hansen. | | |
| 1,630,799 | 5/1927 | Murray | | 230—231 |
| 2,160,401 | 5/1939 | Engelman | | 230—228 |
| 2,434,734 | 1/1948 | Buschmann. | | |
| 2,725,183 | 11/1955 | Hanson | | 230—231 |

ROBERT M. WALKER, *Primary Examiner.*